United States Patent
Komi et al.

(10) Patent No.: US 7,346,271 B2
(45) Date of Patent: Mar. 18, 2008

(54) APPARATUS AND METHOD FOR CONVERTING A COMPRESSED VIDEO STREAM WITH PREVIEW OF CONVERTED STREAM

(75) Inventors: Hironori Komi, Tokyo (JP); Yusuke Yatabe, Yokohama (JP); Masaru Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 979 days.

(21) Appl. No.: 10/441,012

(22) Filed: May 20, 2003

(65) Prior Publication Data

US 2004/0174934 A1 Sep. 9, 2004

(30) Foreign Application Priority Data

Mar. 4, 2003 (JP) ............................. 2003-056510

(51) Int. Cl.
*H04N 7/01* (2006.01)
*H04N 5/92* (2006.01)
(52) U.S. Cl. .................... 386/131; 375/240.26
(58) Field of Classification Search ............... 386/131, 386/52, 121; 370/240.12; 348/559; 375/240.12, 375/240.26
See application file for complete search history.

(56) References Cited

U.S. PATENT DOCUMENTS

| 3,803,352 | A | * | 4/1974 | Goldberger | 386/131 |
|---|---|---|---|---|---|
| 4,272,790 | A | * | 6/1981 | Bates | 386/52 |
| 5,317,413 | A | * | 5/1994 | Yanagihara | 386/131 |
| 5,544,354 | A | * | 8/1996 | May et al. | 707/4 |
| 5,821,997 | A | * | 10/1998 | Kawamura et al. | 348/231.6 |
| 6,157,739 | A | * | 12/2000 | Yazawa et al. | 382/233 |
| 6,236,802 | B1 | * | 5/2001 | Yamamoto | 386/52 |
| 6,292,620 | B1 | * | 9/2001 | Ohmori et al. | 386/55 |
| 6,791,578 | B1 | * | 9/2004 | Ubillos | 715/716 |
| 6,798,980 | B1 | * | 9/2004 | Seo | 386/125 |
| 6,956,971 | B1 | * | 10/2005 | Cho et al. | 382/236 |
| 2002/0094025 | A1 | * | 7/2002 | Hanamura et al. | 375/240.01 |
| 2003/0012550 | A1 | * | 1/2003 | Sakai et al. | 386/52 |

FOREIGN PATENT DOCUMENTS

| DE | 10035109 A1 | * | 2/2001 |
|---|---|---|---|
| EP | 752686 A2 | * | 1/1997 |
| EP | 1069764 A2 | * | 1/2001 |
| JP | A-2001-36844 | | 2/2001 |

* cited by examiner

*Primary Examiner*—Thai Q. Tran
*Assistant Examiner*—David N Werner
(74) *Attorney, Agent, or Firm*—Mattingly, Stanger, Malur & Brundidge, P.C.

(57) ABSTRACT

An apparatus by which a user can easily set a parameter for conversion when a compression encoding system of video stream is converted is provided. A particular period in a first video stream is repeatedly reproduced to convert the reproduced portion into a second video stream in real time. At that time, the user checks the image quality after conversion on a preview screen and sets a desired conversion parameter. A local decode image is output to the preview screen. Thus, the circuit configuration is simplified.

10 Claims, 7 Drawing Sheets

APPARATUS AND METHOD FOR CONVERTING A COMPRESSED VIDEO STREAM WITH PREVIEW OF CONVERTED STREAM

BACKGROUND OF THE INVENTION

1. Field of the Invention

The present invention relates to an apparatus for converting an encoding system of video stream or video transcoder, a method therefor, and a video recording/reproducing device using the above apparatus.

2. Description of the Related Art

Technologies for digitizing image information and compression encoding by an MPEG video compression technology to store on a storage medium or to transmit through a communication medium have been used for various types of equipment. Such examples are a DVD recording/reproducing device using an MPEG-2 Video (ISO/IEC13818-2) system, communications between portable terminals using an MPEG-4 Video (ISO/IEC14496-2) system, and the like. Because the compression systems are different depending on uses, each device needs to convert data between different compression encoding systems.

To meet the above necessity, there is a device for transcoding the video stream compression coded by the MPEG-2 method into another compression encoding system. At that time, a user desires to check the image quality of the transcoded stream to select a compression parameter for transcoding. A technology therefore has been proposed (e.g., refer to JP-A-2001-36844).

SUMMARY OF THE INVENTION

JP-A-2001-36844 discloses to output the stream before transcoding and the stream after transcoding simultaneously, decodes them and outputs the decoded images at the same time. The user checks the images for a difference in image quality between them to select desired image quality. Such a system reproduces the entire stream before the conversion and also operates to check the image quality of the converted stream. Therefore, it is hard to set the image quality of a short stream portion in detail. For example, when the image quality of a relatively short stream such as moving image mail is to be determined, reproduction of the relevant portion ends so soon that it is difficult to conduct the setting work.

There is also a demand for falling of a transmission time of the converted video stream within a designated value when the converted data is sent through a network. There is also a demand for adjustment of a frame rate and an amount of codes allotted to the frame as the image quality of each frame. When a bit rate is fixed, the frame rate and the allotted code amount of each frame are in a contrary relationship, so that they must be set while being kept in balance. Users have demanded to make such detail setting interactively. But, the JP-A-2001-36844 has not fully considered such ease of use.

In view of the situations described above, the present invention provides a video transcoder by which a user can easily set a parameter at the time of conversion, a method for video transcoder, and a video recording/reproducing device using it.

To achieve the object, the apparatus according to an aspect of the present invention comprises a reproducer means reproducing a first video stream recorded on a storage medium; a stream converter converting the reproduced first video stream into a second video stream; a conversion period designation means designating a conversion period in the first video stream; a stream output unit outputting the converted second video stream; and a preview output unit outputting an image corresponding to a decoded image of the converted second video stream to a display device. The above stream output unit outputs the second video stream for a period designated by the conversion period designator.

Especially, the reproducer repeatedly reproduces the first video stream for the period designated by the conversion period designator, and the preview output unit repeatedly outputs an image corresponding to the decoded image of the period designated by the conversion period designator.

The apparatus according to another aspect of the present invention comprises a stream converter converting the first video stream into the second video stream; a stream output unit outputting the converted second video stream; and a preview output unit outputting an image corresponding to a decoded image of the converted second video stream to a display device. The stream converter generates a local decode image of the second video stream for frame-to-frame motion compensation; and the preview output unit outputs a local decode image generated by the stream converter as an image corresponding to the decoded image of the second video stream.

The apparatus according to the other aspect of the present invention further comprises a parameter setting unit setting a parameter related to the conversion by the stream converter, wherein the stream output unit starts outputting the second video stream after setting of a parameter of the stream converter by the parameter setting unit.

Accordingly, the user can readily set a parameter at the time of conversion by checking the preview screen.

BRIEF DESCRIPTION OF THE DRAWINGS

These and other objects, features and advantages of the present invention will become more readily apparent from the following detailed description when taken in conjunction with the accompanying drawings.

DETAILED DESCRIPTION OF THE INVENTION

Figure 1:
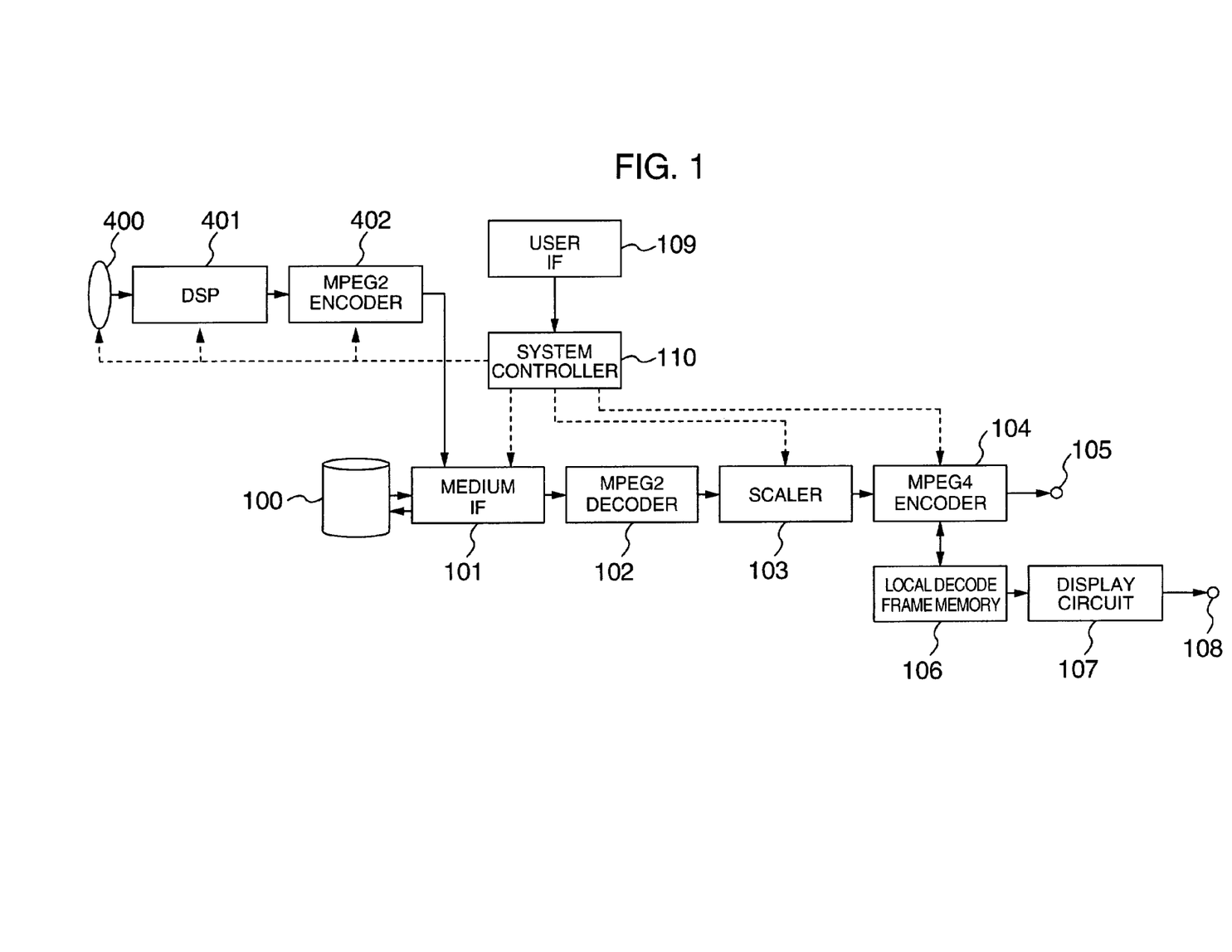
FIG. 1 is a block diagram showing a first embodiment of a video recording/reproducing device including a video transcoder according to the present invention.

FIG. 1 is a block diagram showing the first embodiment of a video recording/reproducing device containing a video transcoder for converting an encoding system of video stream according to the present invention. This device records an imaging signal as an MPEG2 video stream in a storage medium, reproduces it to convert into an MPEG4 video stream and outputs to the outside. When a user wants to record on a medium 100, a recording command is output from a user IF 109, and a system controller 110 having received the recording command controls a lens section 400 and a digital signal processor (DSP) 401 to convert the imaged analog signal into a digital video signal. Besides, the digital video signal is encoded by an MPEG2 encoder 402 to generate an MPEG2 video stream. The MPEG2 video stream is recorded in the storage medium 100 together with unshown audio information or video stream control data through a medium IF (record reproduction circuit) 101.

When the reproduction is instructed by the user IF 109, the MPEG2 video stream recorded in the medium 100 has a prescribed stream portion reproduced from the medium 100. The reproduced video stream is sent to an MPEG2 decoder 102 through the medium IF 101. The video stream decoded here has generally an NTSC size image, and its effective pixel area has a resolution of approximately 704 (horizontal)×480 (vertical) per frame. At the time of normal reproduction, the image is output with the above size to an outside display or the like.

Conversion of the reproduced MPEG2 stream into the MPEG4 stream will be described. A scaler 103 for resolution conversion scales down the decode image of MPEG2 having the NTSC size to a resolution (e.g., approximately QCIF (176×144)) to be handled in MPEG4 and sends to an MPEG4 encoder 104. The MPEG4 encoder 104 MPEG4-encodes the sent image and outputs to the outside from an output terminal 105.

At that time, the MPEG4 encoder 104 stores the same image data as that when each frame was decoded in a local decode frame memory 106 in order to calculate motion compensation between the frames in the encoding process. Specifically, the image data stored in this local decode frame memory 106 corresponds to an image which is actually obtained when the video stream MPEG4-encoded and output to the outside from the output terminal 105 is decoded later. In this embodiment, the image data stored in the local decode frame memory 106 is used as image data for preview. A display circuit 107 reads the image data in display order from the local decode frame memory 106 and outputs it as a picture signal to the display device from an output terminal 108. The user can observe the preview image shown on the display device to check the image quality of the converted video stream to be output from the output terminal 105 to the outside.

In this embodiment, a local decode image produced in the process of encoding is used to generate the preview screen, so that it is not necessary to include another decode circuit. It has an advantage that the circuit can be made small in size. In comparison with the case where the output stream is redecoded to form the preview screen, it also has an advantage that a response time from the setting by the user to the output of an image reflecting the setting becomes short, and feedback becomes quick.

The display device has been described to be connected to the outside but may be included in the main apparatus.

The generation of the local decode image described above will be described in detail with reference to FIG. 8 and FIG. 9.

Figure 8:
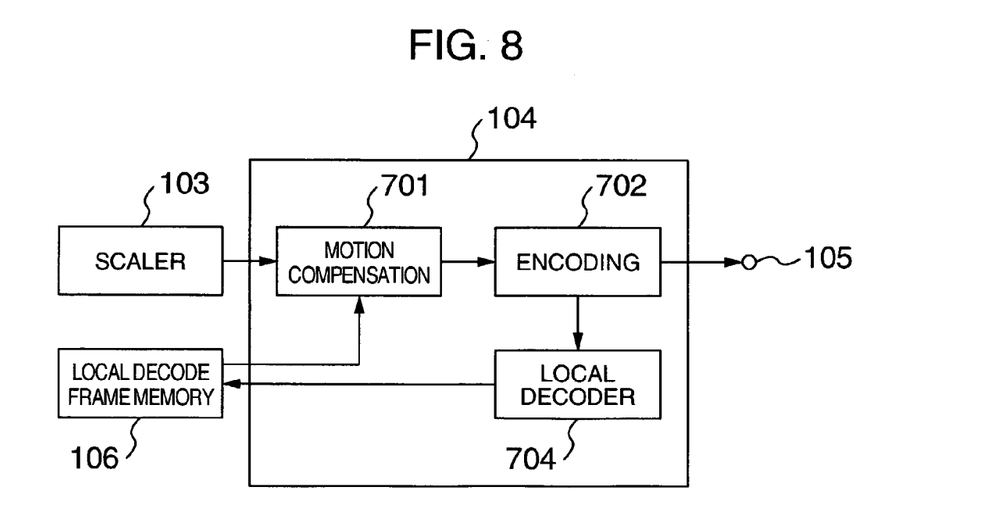
FIG. 8 is a detail block diagram showing generation of a local decode image.

FIG. 8 shows a flow that the image which has the resolution converted by the scaler 103 is encoded by the MPEG4 encoder 104 to generate a simple profile stream. For a P picture (predictive-coded picture), the resolution converted image is subject to motion search with the generated local decode image and the extraction of a frame-to-frame difference value by a motion compensation circuit in the MPEG4 encoder 104. The extracted difference value is encoded to MPEG4 video stream by an encoding circuit 702. This stream is decoded by a local decoder 704 to obtain a local decode image. This image is stored again in the local decode frame memory 106 and referred to for encoding of a frame in the later stage. For an I picture (intra-coded picture), motion compensation is not performed, and encoding is performed according to pixel information only in the frame.

Figure 9:
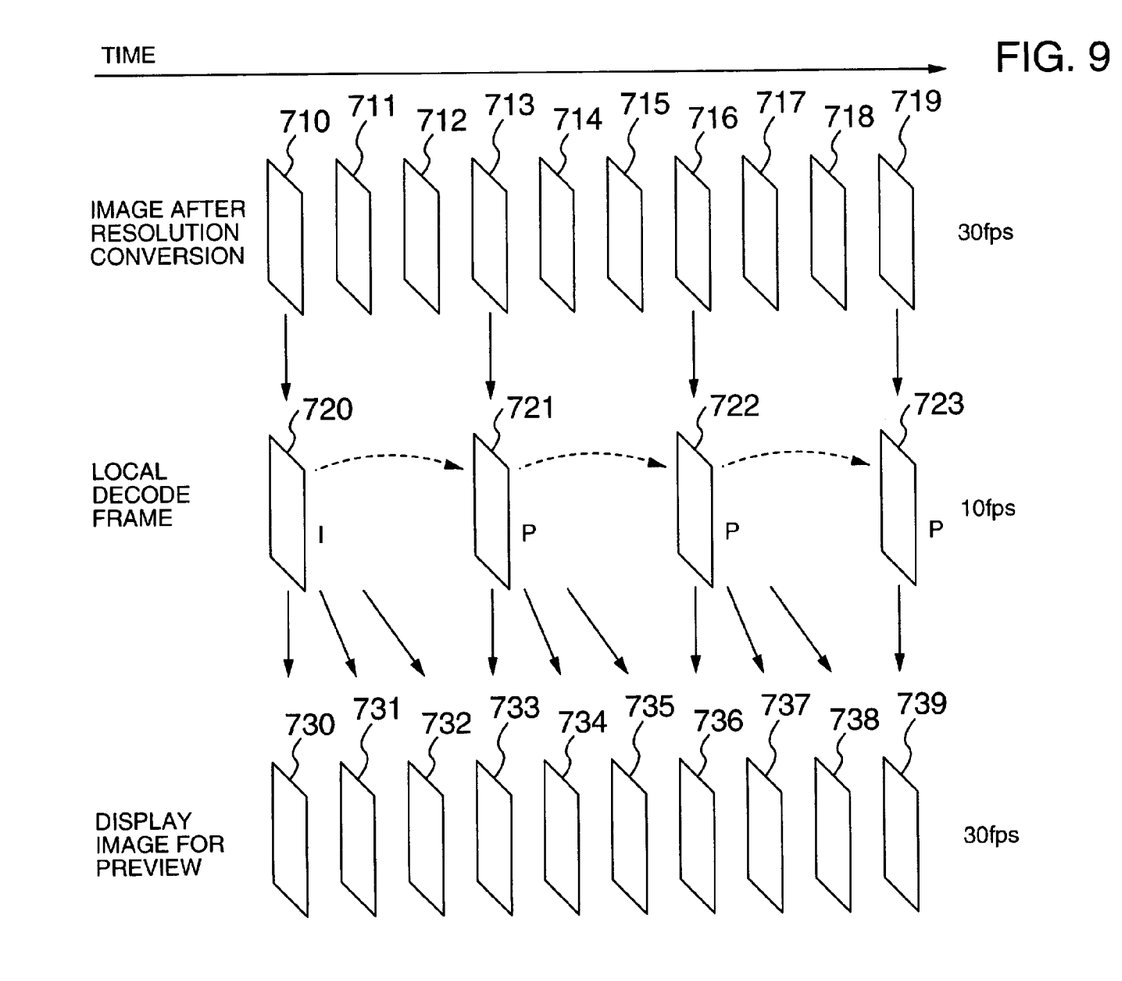
FIG. 9 is a diagram illustrating a process of generating a preview image from a local decode image.

FIG. 9 illustrates a process of generating a preview display image from the local decode frame by the display circuit 107. It is assumed that the image converted by the resolution conversion circuit 103 is supplied at a frame rate of 30 fps (frame/sec). Among the resolution-converted images supplied at 30 fps, data on one image is extracted from every three images to generate a local decode image. For example, the I picture is encoded and local decoded from the image of a frame 710 accordIng to the flow shown in FIG. 8 to generate an I frame 720. A P picture has motion compensation performed with reference to the picture before the resolution conversion and the previous local decode image. For example, a P frame 721 has motion compensation performed from a frame 713 after the resolution conversion and the I frame 720 of the local decode image. Then, a difference value is encoded and local decoded to generate the local decode image 721. In this example, the local frame has a generation rate of 10 fps, so that, for example in order to output as NTSC video, the display circuit 107 repeatedly displays the local decode image to generate preview images 730 to 739. In the above configuration, the local decode frame has the same image quality as that when the generated stream is decoded by an outside decoder, so that the Image checked as a preview image reproduces a decoding situation faithfully.

Figure 2:
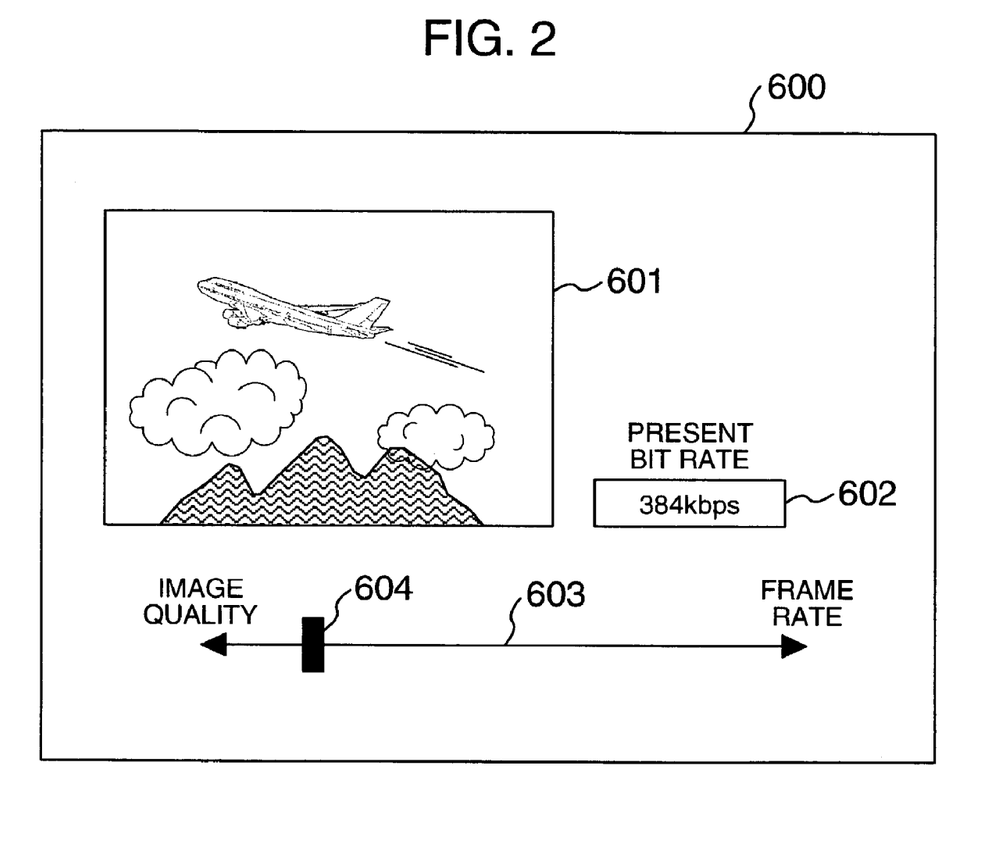
FIG. 2 is a diagram showing an example of a preview screen of the embodiment shown in FIG. 1.

FIG. 2 shows an example of the preview screen shown on the display device In the embodiment of FIG. 1. When the preview operation is designated through the user IF 109, preview image data is output from the display circuit 107. The preview screen shows parameters of the image quality, frame rate, bit rate and the like after the conversion into the MPEG4 video stream. Reference numeral 601 denotes an image corresponding to one after MPEG4 encoding, 602 denotes a portion indicating a designated bit rate, 603 denotes a horizontal slide bar for designating which of the image quality and the frame rate is given higher priority, and 604 denotes a slider for indicating a setting position or the current image quality and frame rate. The user can watch the preview screen to operate the slider for the user IF 109 so to change each parameter setting. The control circuit 110 generates a control parameter for conversion and sends to the scaler 103 and the MPEG4 encoder 104. The MPEG4 encoder receives the information, reflects the above parameters and generates MPEG4 video stream in real time.

FIG. 2 shows an example of the preview screen shown on the display device in the embodiment of FIG. 1. When the preview operation is designated through the user IF 109, preview image data is output from the display circuit 107. The preview screen shows parameters of the image quality, frame rate, bit rate and the like after the conversion into the MPEG4 video stream. Reference numeral 601 denotes an image corresponding to one after MPEG4 encoding, 602 denotes a portion indicating a designated bit rate, 603 denotes a horizontal slide bar for designating which of the image quality and the frame rate is given higher priority, and 604 denotes a knob for indicating a setting position of the current image quality and frame rate. The user can watch the preview screen to operate the button for the user IF 109 so to change each parameter setting. The control circuit 110 generates a control parameter for conversion and sends to the scaler 103 and the MPEG4 encoder 104. The MPEG4 encoder receives the information, reflects the above parameters and generates MPEG4 video stream in real time.

By configuring as described above, a decode image with the parameters being set is displayed in real time when the video stream is converted, so that the result can be obtained immediately. The user can check the results of the parameters set by the user to interactively set the parameters to provide a desired image, and ease of use is improved.

When the user IF 109 is operated to decide and select a conversion parameter, the converted MPEG4 video stream is output from the terminal 105 according to the selected conditions. The parameters of such conditions are stored in a storage section provided in the system controller 110. At the subsequent generation of the MPEG4 video scream, the system controller 110 controls the MPEG4 encoder 104 to encode according to the stored parameters.

Figure 7:
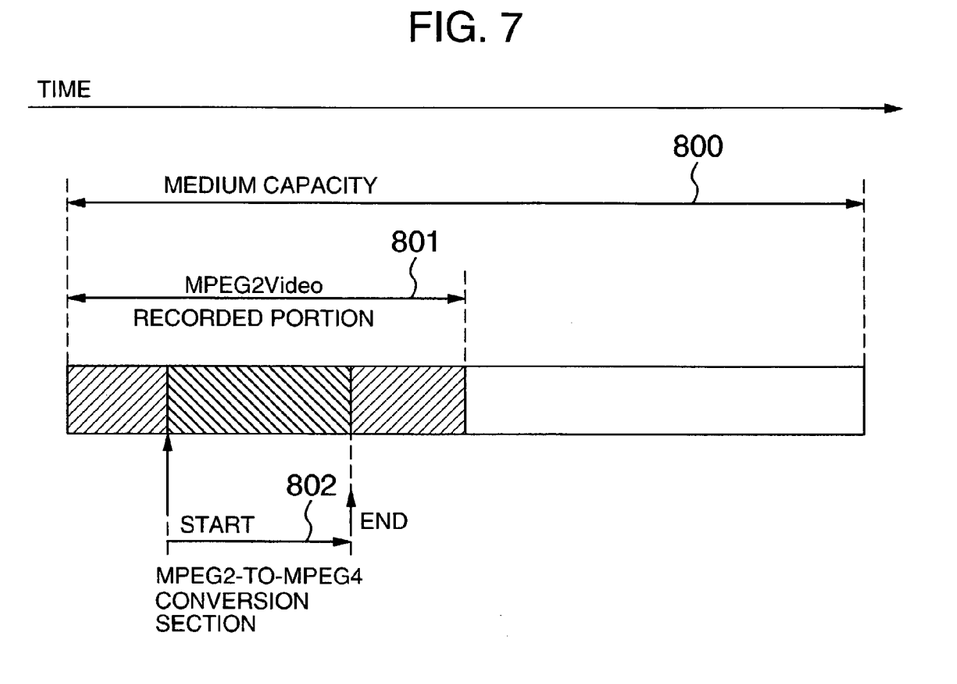
FIG. 7 is a diagram illustrating that a conversion stream is generated during a designated period only.

FIG. 7 is a diagram showing a portion to perform the stream conversion into MPEG4 in this embodiment. Reference numeral 800 indicates a total recordable capacity of the storage medium 100 with time, and a period in which encoding and recording are conducted as MPEG2 video is indicated by 801. A portion converted into the MPEG4 stream and output is a period indicated by 802 and forms a part of the recorded portion. The start and end points of the above period are instructed by a conversion period designation means possessed by the user IF 109. For example, they are designated by pushing a preview period decision button while reproducing the MPEG2 video. Then, when preview output is designated by the user IF 109, only the period 802 is reproduced by the MPEG2 decoder 102 to convert into the MPEG4 stream. By configuring as described above, when the part with a short stream period in which transmission of motion picture mail or the like can be made is reviewed for example, only the image quality of a part to be actually sent can be checked.

Figure 3:
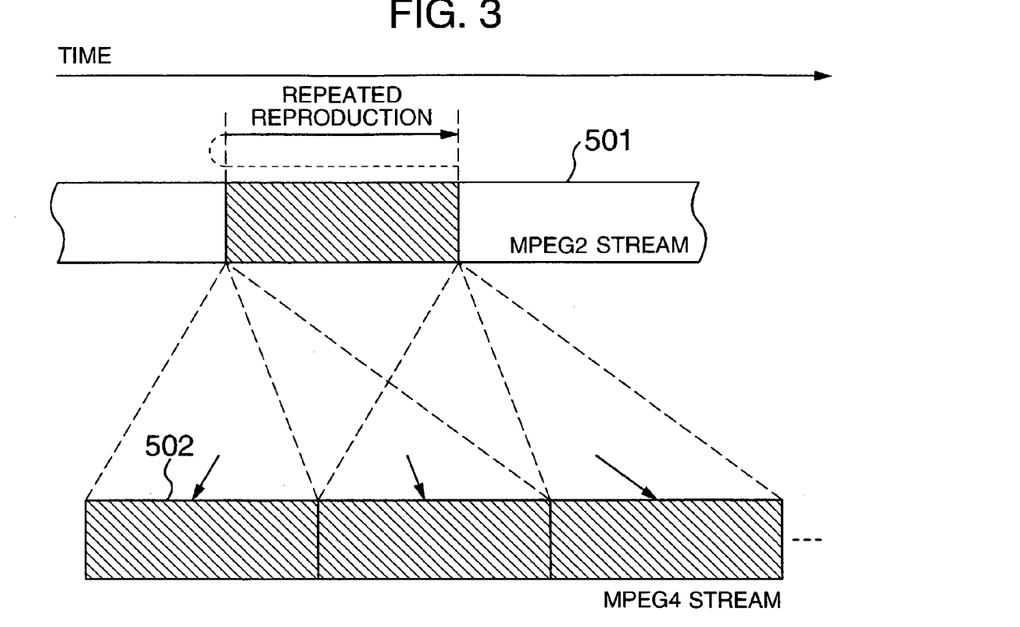
FIG. 3 is a diagram showing an example of an image signal shown on a preview screen.

FIG. 3 is a diagram showing an example of the image signal shown in the preview screen of FIG. 2. Specifically, it shows the relation between the MPEG2 stream reproduction position and the MPEG4 stream along the time axis. For the MPEG2 stream recorded in the medium 100, the portion to be reproduced for preview is designated by the conversion period designation means of the user IF 109 described with reference to FIG. 7. Thus, only a specified period of a short time, e.g., 10 or 20 seconds, is repeatedly reproduced. The MPEG4 encoder 104 successively encodes the stream of the designated period, and the display circuit 107 repeatedly generates the preview screen.

By configuring as described above, the user can check by repeatedly watching the screen encoded according to the parameters determined by the user. In other words, checking of the same design facilitates detail comparison with attention paid to a given image or a given parameter. And, for example, when the motion as a design or a pattern of the object is very small, the image quality tends to deteriorate at the time of MPEG4 encoding. Even in such a case, adjustment of the parameter by repeatedly reproducing allows to maintain the image quality of a portion, whose image quality is easily disturbed, up to a level designated by the user. Accordingly, the adjustment can be made according to the desire of the user to have the frame rate sacrificed to some extent. Especially, when a stream of a short time such as motion picture mail is generated, the parameter adjustment can be continued without stopping the preview by repeatedly reproducing. Meanwhile, the stream is not output from the terminal 105 to the outside but output after the decision with the preview, so that unnecessary data being adjusted is prevented from being received by the outside device.

For example, when MPEG2 video stream once recorded on a DVD is sent as MPEG4 video stream to another device according to this embodiment, a combination of the frame rate and the image quality most desired by the user in the bit rate at the time of transmission can be previously determined on the preview screen and sent.

When the scaler 103 is controlled according to the designated resolution by the user IF 109 to change the resolution of the MPEG4 stream to be output, the user can interactively set on the preview screen. Besides, when a total size of streams to be output is limited, it can be output from the terminal 105 after a total bit amount at the time of setting is calculated on the preview screen and checked by the user whether the limit is met.

Figure 4:
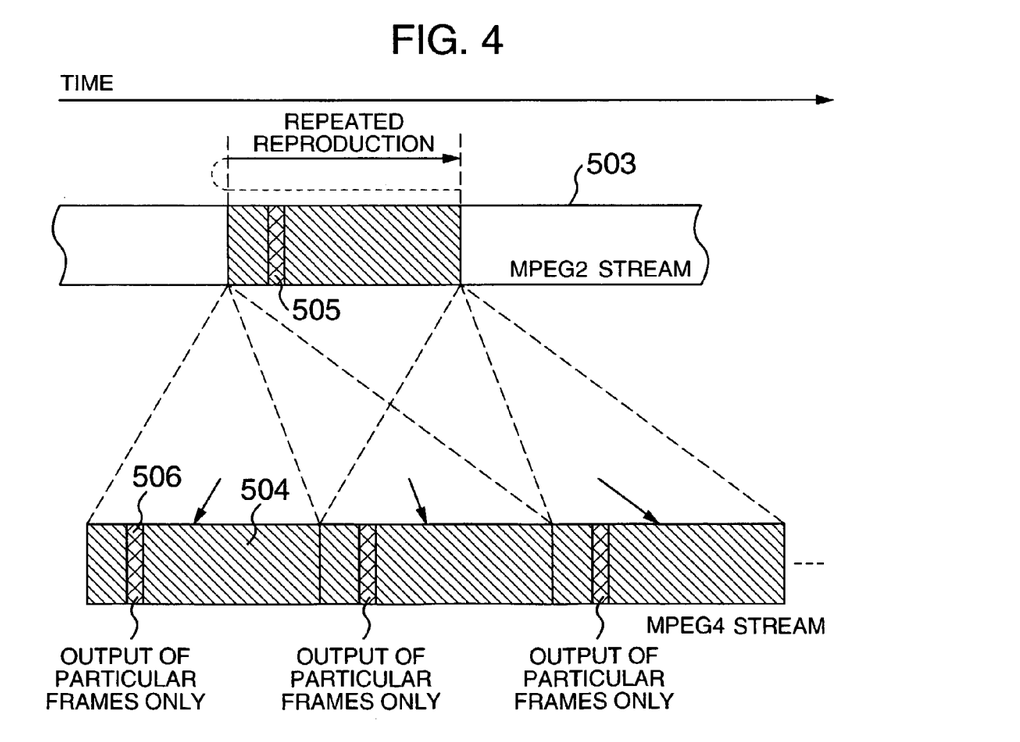
FIG. 4 is a diagram showing another example of the image signal shown on the preview screen.

FIG. 4 is a diagram showing another example of the image signal shown on the preview screen of FIG. 2. In this case, it is configured that in an MPEG2 video stream 503 before the conversion into the MPEG4, only a particular frame 505 is designated by the user IF. The MPEG2 stream being reproduced repeatedly is encoded by the MPEG4, then only a frame 506 in the MPEG4 stream corresponding to the particular frame 505 is output and shown on the preview screen. In this case, the MPEG4 stream is converted as a motion picture from the MPEG2 stream, but only a still image of a particular frame is shown on the preview screen (the section 601 of FIG. 2).

Specifically, it can be implemented by the display circuit 107 of FIG. 1 which updates the image 601 in the preview screen only when an effective frame required to be shown is specified and freezes the entire image at all other times.

Such a configuration is effective when importance is attached to not the frame rate but to the image quality of each of the respective images, and a change in image quality against the parameter change can be detected with higher reliability by decoding and outputting a particular image. And, the parameter can be adjusted without seeing the afterimages of other frames. For example, it is particularly effective when detail resolution is important for a surveillance system or the like.

Figure 5:
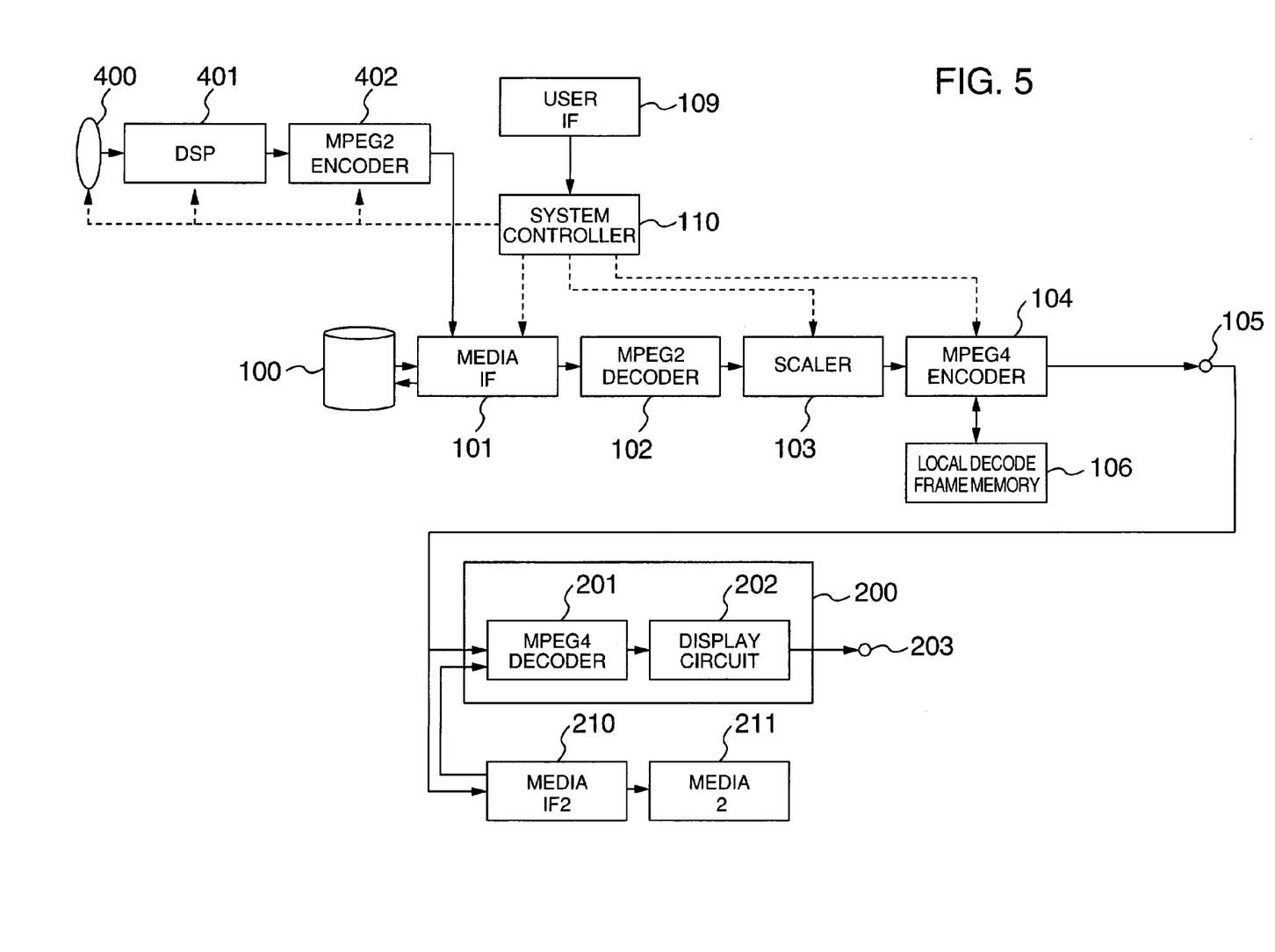
FIG. 5 is a block diagram showing a second embodiment of the video recording/reproducing device including a video transcoder according to the present invention.

FIG. 5 is a block diagram showing a second embodiment of the video recording/reproducing device containing the apparatus or video transcoder for converting an encoding system of video stream according to an embodiment of the present invention. This device is configured to record/reproduce the video stream encoded by the MPEG4 encoder 104 to/from a second medium 211 via a medium IF2 (second medium interface) 210 in addition to the configuration of the first embodiment. The MPEG4 video stream reproduced from the second medium 211 is decoded by an MPEG4 decoder circuit 201 and output from an output terminal 203 to the display device through a display circuit 202. This configuration is also possible to perform the preview operation before recording on the second medium 211 as described in the first embodiment. At that time, the MPEG4 stream output from the terminal 105 is decoded by the MPEG4 decoder 201 and outputted as a preview screen by the display circuit 202.

This embodiment is effective when the MPEG2 stream recorded on the first medium 100 is converted into the MPEG4 video stream and backed up on the second medium 211. To generate a decode screen at the time of previewing, a decode image may be read from the local decode frame memory 106 and output to the preview screen via the display circuit 202 in the same way as in the first embodiment.

Figure 6:
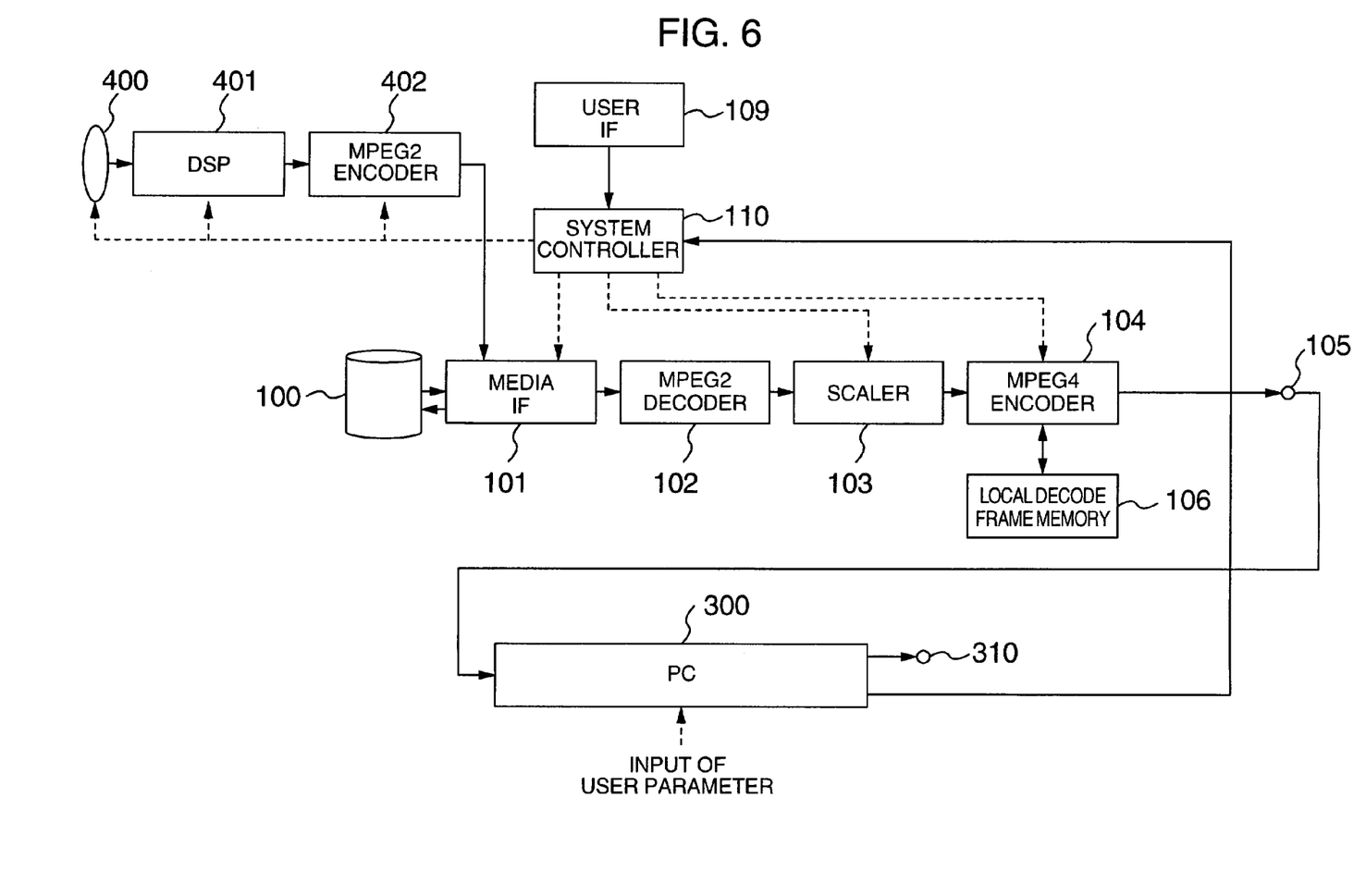
FIG. 6 is a block diagram showing a third embodiment of the video recording/reproducing device including a video transcoder according to the present invention.

FIG. 6 is a block diagram showing a third embodiment of the video recording/reproducing device containing the apparatus or video transcoder for converting an encoding system of video stream according to the present invention. This device outputs the converted MPEG4 stream from the terminal 105 and sends to an outside device 300 (e.g., a general-purpose personal computer (hereinafter called as the PC)). The sent MPEG4 stream is decoded by a software decoder on the PC 300 and output from a terminal 310 so to display an image on an unshown display or the like. At this time, the preview screen as described in the first embodiment can be generated by software contained in the PC 300. When the preview screen is checked from the PC to find that it is necessary to change the parameter, only set parameter information is sent from the PC to the video recording/reproducing device as the main device. More specifically, a signal line is disposed to send to the control circuit 110. This signal line can be, for example, control signal communications via USB, communications by IEEE1394, wireless communications using a wireless LAN, or the like.

Based on the parameter sent from the PC 300, the MPEG4 stream is changed and output to the PC 300, so that the stream conversion to the user's desired image quality can be made. In this embodiment, the conversion parameter setting can be changed by a remote control because the video recording/reproducing device is separated from the outside device (PC) which sets a parameter for conversion. And, the device configuration can be simplified because the main body does not have an MPEG4 decode display circuit therein.

In the above-described embodiments, the change of video stream from MPEG2 to MPEG4 was described, but the present invention can also be applied to an image compression encoding in general. It is apparent that the present invention is also effective when used for other image encoding systems, for example, H.263 and JPEG. It is also effective to change a frame rate and a bit rate in the stream conversion between the same encoding systems. For the preview screen configuration, even when another screen configuration is used, the same effects can be obtained by a screen having a configuration based on a combination of the preview image and the adjustment parameter. Besides, the storage medium is not particularly limited, and an optical disk, a magnetic disk, an IC memory, or the like can be used.

According to the present invention, the ease-of-use at the time of conversion of a captured image or the like to the user's desired image quality is improved.

The invention may be embodied in other specific forms without departing from the spirit or essential characteristics thereof. The present embodiment is therefore to be considered in all respects as illustrative and not restrictive, the scope of the invention being indicated by the appended claims rather than by the forgoing description and range of equivalency of the claims are therefore intended to be embraced therein.

What is claimed is:

1. An apparatus for converting an encoding system of video stream, wherein the apparatus converts a first video stream recorded on a storage medium by a first compression encoding system into a second video stream using a second compression encoding system, said apparatus comprising:

a reproducer reproducing the first video stream recorded on the storage medium;

a stream converter converting the reproduced first video stream into the second video stream;

a conversion period designator designating a conversion period in the first video stream;

a stream output unit outputting the converted second video stream;

a preview output unit outputting an image corresponding to a decoded image of the converted second video stream to a display device; and a user interface inputting a parameter for converting the first video stream into the second video stream, wherein said stream output unit outputs the second video stream for a period designated by the conversion period designator, wherein said reproducer repeatedly reproduces the first video stream for a period designated by said conversion period designator, wherein said preview output unit outputs only an image of a particular frame in an image corresponding to the decoded image of the converted second video stream, and holds the output of the particular frame without outputting the remainder of the converted second video stream, and wherein said preview output unit, when said user interface changes the parameter during a period at which the first video stream is converted into the second video stream, outputs the particular frame in the converted second video stream after the change of the parameter, in real time.

2. The apparatus for converting an encoding system of video stream according to claim 1, further comprising:

a parameter setting unit setting a parameter relating to the conversion by the stream converter, wherein said stream output unit starts outputting the second video stream after said parameter setting unit sets a parameter of the stream converter.

3. The apparatus for converting an encoding system of video stream according to claim 2, wherein the parameter set by the parameter setting unit is at least one of an image size, a frame rate, a bit rate and a stream size.

4. The apparatus for converting an encoding system of video stream according to claim 1, further comprising:

a parameter input unit inputting a parameter relating to the conversion by said stream converter from an outside device.

5. A video recording/reproducing device using the apparatus for converting an encoding system of video stream according to claim 1, further comprising:

an imaging section taking a picture of a subject;

an encoder compression encoding an image signal from said imaging section by the first compression encoding system;

a recorder recording the first video stream generated by said encoder on a storage medium; and a display device showing output of the preview output unit.

6. The video recording/reproducing device according to claim 5, further comprising:

a second recorder recording the second video stream output from the stream output unit on a second storage medium.

7. A digital signal conversion device for converting a first digital signal recorded on a storage medium by a first compression encoding system into a second digital signal using a second compression encoding system, said digital signal conversion device comprising:

a reproducer reproducing the first digital signal recorded on the storage medium;

a signal converter converting the reproduced first digital signal into the second digital signal;

a conversion period designator designating a conversion period in the first digital signal;

a first output unit outputting the converted second digital signal;

a second output unit outputting a decoded signal of the converted second digital signal; and a user interface inputting a parameter for converting the first digital signal into the second digital signal, wherein the first output unit outputs the second digital signal for the period designated by said conversion period designator, wherein said reproducer repeatedly reproduces the first digital signal for a period designated by said conversion period designator, wherein said second output unit outputs only a signal of a particular frame in a signal corresponding to the decoded signal of the converted second digital signal, and holds the output of the particular frame without outputting the remainder of the converted second digital signal, and wherein said second output unit, when said user interface changes the parameter during a period at which the first digital signal is converted into the second digital signal, outputs the particular frame in the converted second digital signal after the change of the parameter, in real time.

8. A method for converting an encoding system of video stream which converts a first video stream recorded on a storage medium using a first compression encoding system into a second video stream using a second compression encoding system, comprising:

reproducing the first video stream recorded on the storage medium;

designating a period for converting into the second video stream in the first video stream;

converting the first video stream of the designated period into the second video stream;

displaying an image corresponding to a decoded image of the converted second video stream;

inputting a parameter for converting the first video stream into the second video stream;

outputting the converted second video stream for the designated period after displaying the image; repeatedly reproducing the first video stream for the designated period;

outputting only an image of a particular frame in an image corresponding to the decoded image of the converted second video stream, and holding the output of the particular frame without outputting the remainder of the converted second video stream; and when the parameter changes during a period at which the first video stream is converted into the second video stream, outputting the particular frame in the converted second video stream after the parameter changes, in real time.

9. The method for converting an encoding system of video stream according to claim 8, further comprising:

setting a parameter relating to the video stream conversion, wherein said second video stream is started to be output after setting the parameter.

10. The method for converting an encoding system of video stream according to claim 9, wherein the parameter is at least one of an image size, a frame rate, a bit rate and a stream size.

* * * * *